United States Patent
Chuang

(10) Patent No.: US 10,674,000 B1
(45) Date of Patent: Jun. 2, 2020

(54) ADJUSTABLE TELESCOPIC BRACKET

(71) Applicant: EHOMA INDUSTRIAL CORPORATION, Taichung (TW)

(72) Inventor: Chun-Huan Chuang, Taichung (TW)

(73) Assignee: EHOMA INDUSTRIAL CORPORATION, Taichung (TW)

( * ) Notice: Subject to any disclaimer, the term of this patent is extended or adjusted under 35 U.S.C. 154(b) by 0 days.

(21) Appl. No.: 16/506,273

(22) Filed: Jul. 9, 2019

(51) Int. Cl.
*H04M 1/12* (2006.01)
*F16M 11/04* (2006.01)
*H04M 1/04* (2006.01)

(52) U.S. Cl.
CPC ............ *H04M 1/12* (2013.01); *F16M 11/041* (2013.01); *H04M 1/04* (2013.01)

(58) Field of Classification Search
CPC ......... H04M 1/12; H04M 1/04; F16M 11/041
See application file for complete search history.

(56) References Cited

U.S. PATENT DOCUMENTS

| | | | |
|---|---|---|---|
| 7,407,143 B1* | 8/2008 | Chen ................... | B60R 11/0241 248/309.1 |
| 8,833,716 B2* | 9/2014 | Funk ...................... | F16M 13/02 248/316.4 |
| 2005/0236536 A1* | 10/2005 | Fan ......................... | B60R 11/02 248/176.3 |
| 2006/0215836 A1* | 9/2006 | Wang ...................... | H04M 1/04 379/455 |
| 2014/0263931 A1* | 9/2014 | Chen ..................... | F16M 11/041 248/576 |
| 2015/0267863 A1* | 9/2015 | Chang ...................... | A45B 3/00 248/333 |
| 2017/0188724 A1* | 7/2017 | Lin ...................... | E05B 73/0082 |

FOREIGN PATENT DOCUMENTS

TW M554868 U 2/2018

* cited by examiner

*Primary Examiner* — Tuan D Nguyen
(74) *Attorney, Agent, or Firm* — Muncy, Geissler, Olds & Lowe, P.C.

(57) ABSTRACT

An adjustable telescopic bracket for clamping an object includes a main body, a driving assembly, an elastic assembly, and a telescopic member. The driving assembly and the elastic assembly are disposed in an operating space of the main body. The telescopic member has a sliding portion in a sliding groove of the main body. The sliding portion has a resisting portion disposed at an end thereof, and a driving section which is transmittably connected with the driving assembly. The sliding portion is able to be extended, forcing the driving assembly to rotate, whereby the elastic assembly generates a pre-force. When the elastic assembly is released, the pre-force drives the driving assembly to rotate reversely. As a result, the resisting portion is retracted to the main body with the sliding portion on which the resisting portion is disposed, for clamping the object.

10 Claims, 9 Drawing Sheets

US 10,674,000 B1

ADJUSTABLE TELESCOPIC BRACKET

BACKGROUND OF THE INVENTION

1. Field of the Invention

The present invention relates to adjustable telescopic brackets, and more particularly, to an adjustable telescopic bracket capable of being extended and retracted for clamping and positioning an object.

2. Description of the Related Art

A bracket is designed for positioning a mobile communication device, such as a smart phone, a tablet computer, and a personal digital assistant, and allows the device to be positioned anywhere without being held by a user. The bracket is generally divided into a fixed form and an adjustable form. The fixed form of the bracket is basically customized for a particular kind of the mobile communication devices, therefore unable to be generally applicable. The adjustable form of the bracket allows the clamping width thereof to be adjusted according to a size of the mobile communication device, therefore being generally applicable for differently sized mobile communication devices.

As shown by Taiwan patent M554868, a bracket for mobile devices includes two telescoping clamp members. Each of the telescoping clamp members is able to be horizontally extended and retracted with respect to the bracket for clamping and positioning the mobile device. In general, when a user is attempting to clamp the mobile device on the bracket, the user has to use one hand to hold the mobile device, and use the other hand to extend two telescoping clamp members. If two telescoping clamp members are individually disposed, the user has to extend two telescoping clamp members, respectively, for allowing the mobile device to be positioned between the two telescoping clamp members. As a result, the mobile device easily fails to be clamped on the bracket or even falls to be damaged, risking the safety thereof. Thus, the present invention aims at solving the issue that two telescoping clamp members of the bracket are incapable of being simultaneously extended and retracted by a single hand of the user.

SUMMARY OF THE INVENTION

For improving the issues mentioned above, the present invention provides an adjustable telescopic bracket. When a telescopic member thereof is extended, a sliding portion is extended simultaneously. When an object is placed on the bracket, a resisting portion is simultaneously retracted to the main body along with the sliding portion at which the resisting portion is disposed, thereby clamping the object.

In one embodiment of the present invention, an adjustable telescopic bracket provided for clamping an object includes:

a main body having an operating space and a sliding groove which horizontally penetrates the operating space;

a driving assembly rotatably disposed in the operating space and having a gearing portion coaxially disposed with the driving assembly;

an elastic assembly disposed in the operating space, with two ends of the elastic assembly connected with the main body and the driving assembly, respectively; and a telescopic member having a sliding portion disposed in the sliding groove, so as to slide along a single rectilinear direction; a resisting portion is disposed at an end of the sliding portion, and is able to resist against the object; the sliding portion is stacked on the sliding groove; the sliding portion has a driving section transmittably connected with the gearing portion; the sliding portion is able to be extended simultaneously for forcing the driving assembly to rotate, whereby the elastic assembly generates a pre-force; when the elastic assembly is released, the pre-force drives the driving assembly to rotate reversely, such that the resisting portion is simultaneously retracted to the main body together with the sliding portion at which the resisting portion is arranged, thereby clamping the object.

Thus, a user is able to use a single hand to extend the telescopic member simultaneously for clamping the object by the adjustable telescopic bracket provided. After the user places the object on the bracket with a single hand and releases the telescopic member, the pre-force generated by the elastic assembly forces the driving assembly to rotate reversely, whereby the sliding portion is retracted to the main body. As a result, the resisting portions moves toward each other for temporarily clamping the object. Thus, the bracket provided achieves the convenience and safety for clamping the object.

DETAILED DESCRIPTION OF THE INVENTION

Figure 1:
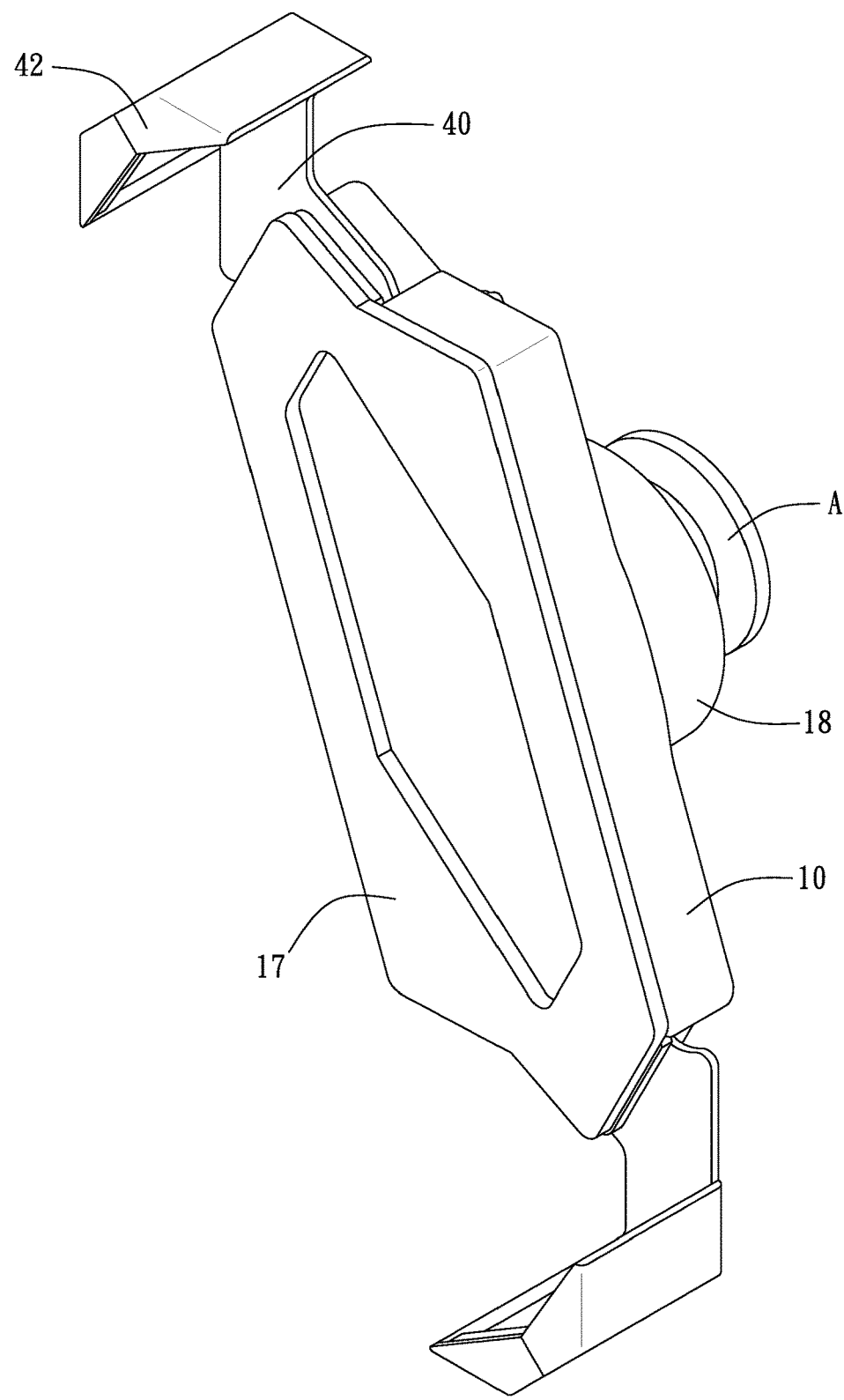
FIG. 1 is a perspective view of the telescopic bracket in accordance with one embodiment of the present invention.
Figure 2:
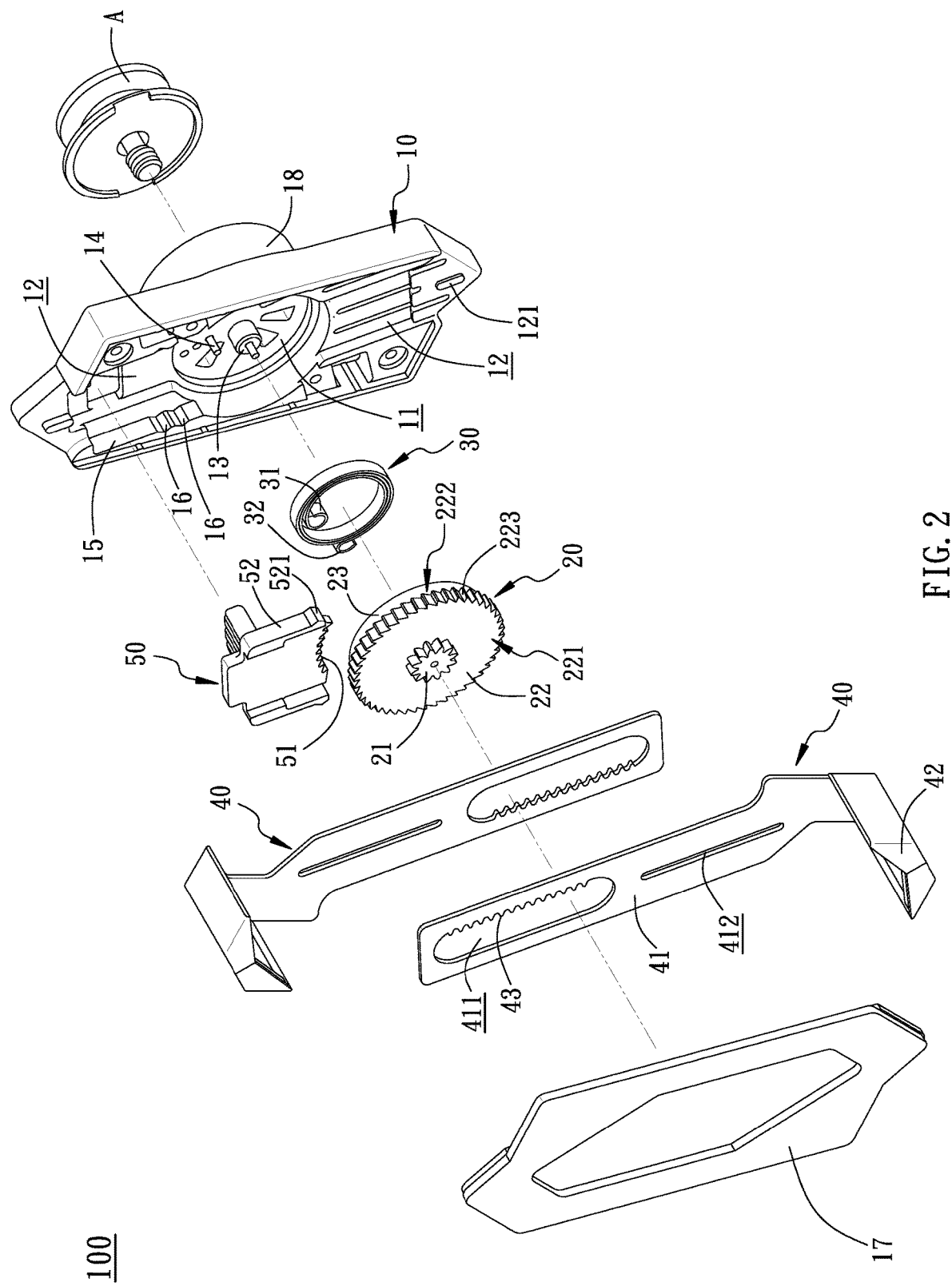
FIG. 2 is an exploded view of the telescopic bracket in accordance with one embodiment of the present invention.
Figure 3:
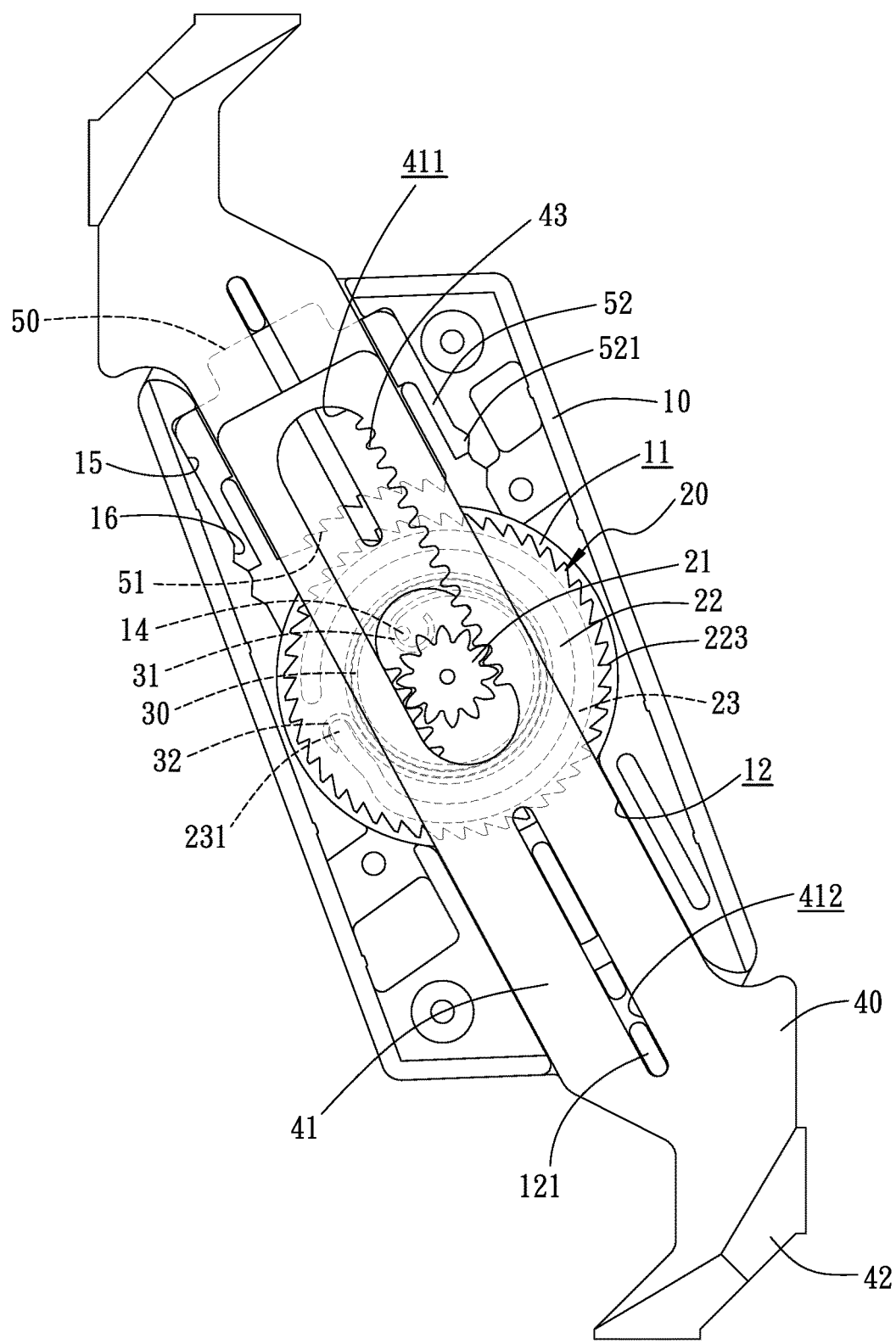
FIG. 3 is a plan view illustrating a configuration of the components in a main body of the telescopic bracket.
Figure 4:
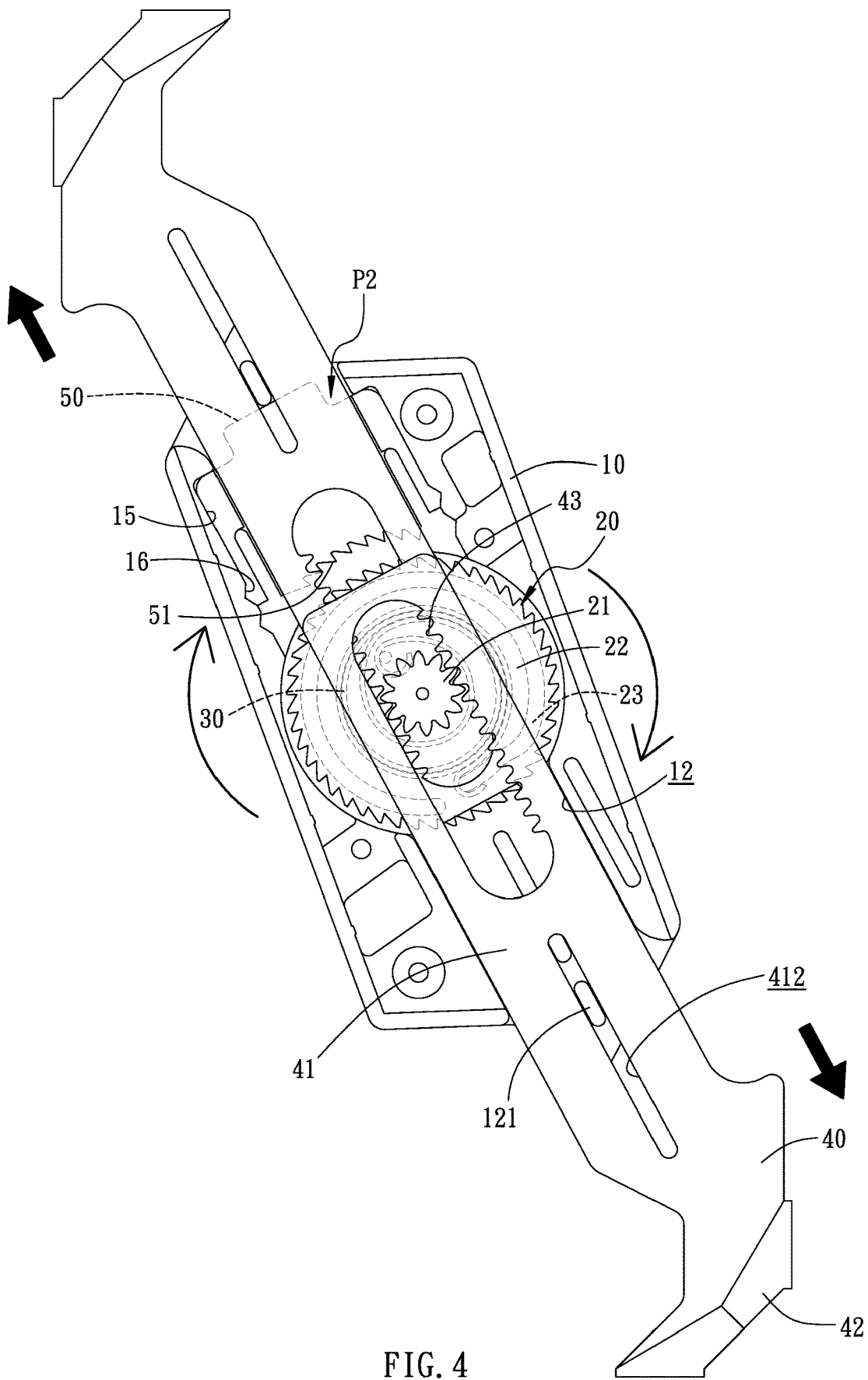
FIG. 4 is a schematic view illustrating the telescopic bracket of FIG. 3, wherein two telescopic members are extended simultaneously.
Figure 5:
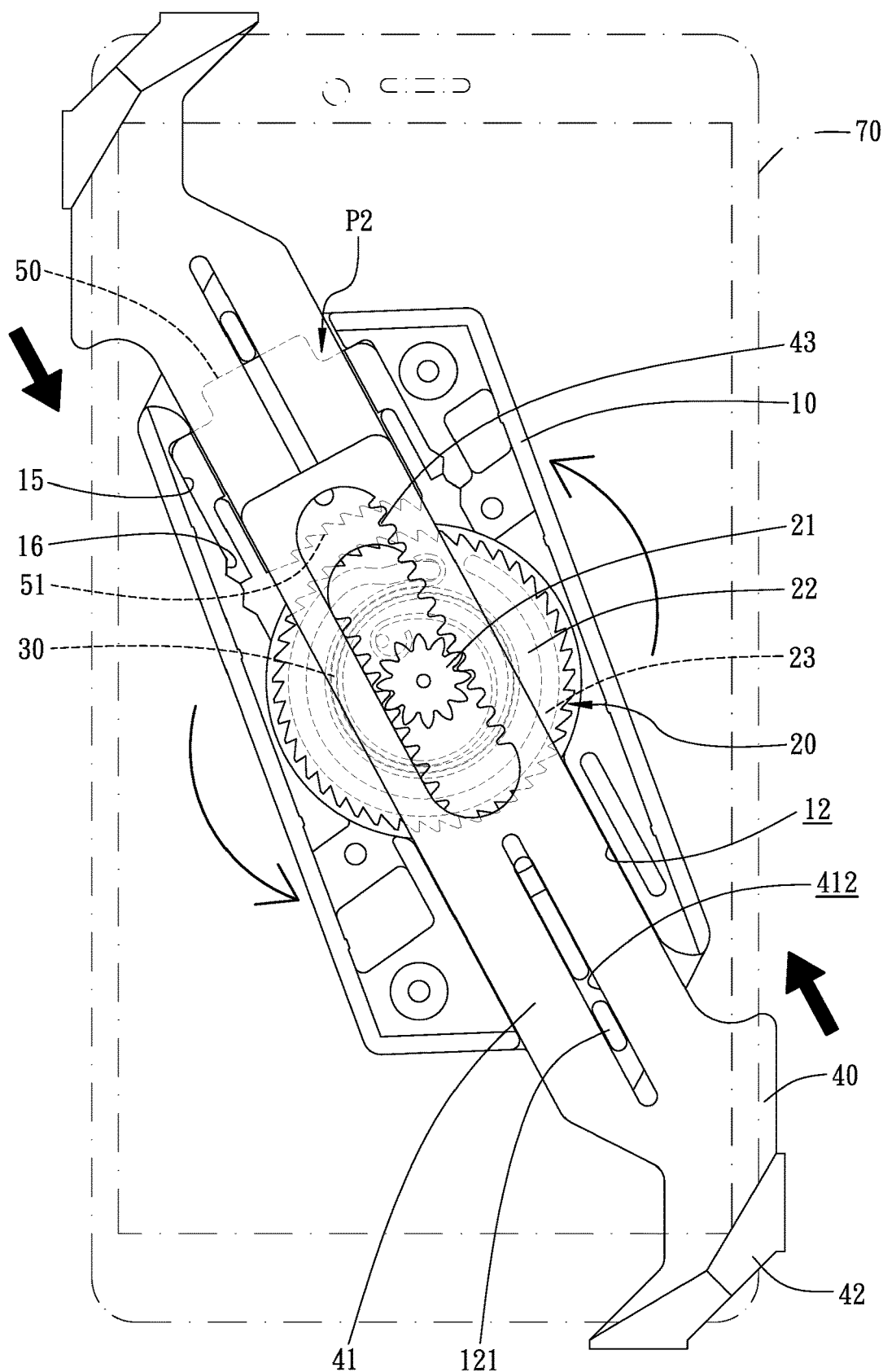
FIG. 5 is a schematic view illustrating the telescopic bracket of FIG. 4, wherein two telescopic members are stopped being extended to be simultaneously retracted for clamping a mobile communication device with the two resisting portions.
Figure 6:
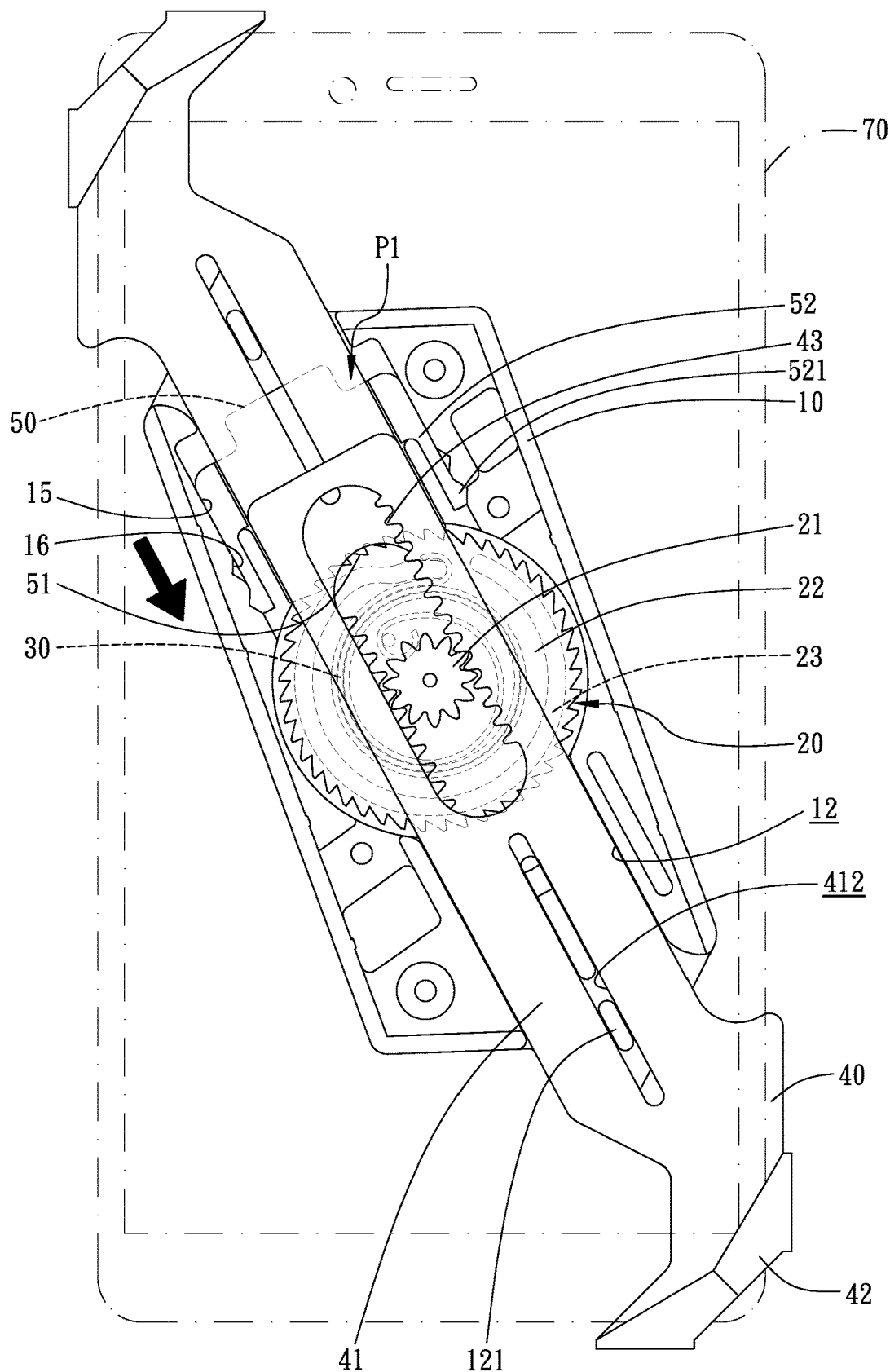
FIG. 6 is a schematic view illustrating the telescopic bracket of FIG. 5, wherein a toggle block is switched from a releasing position to a clamping position, such that a retaining tooth resists against a peripheral tooth, preventing a rotary disk from rotating.
Figure 7:
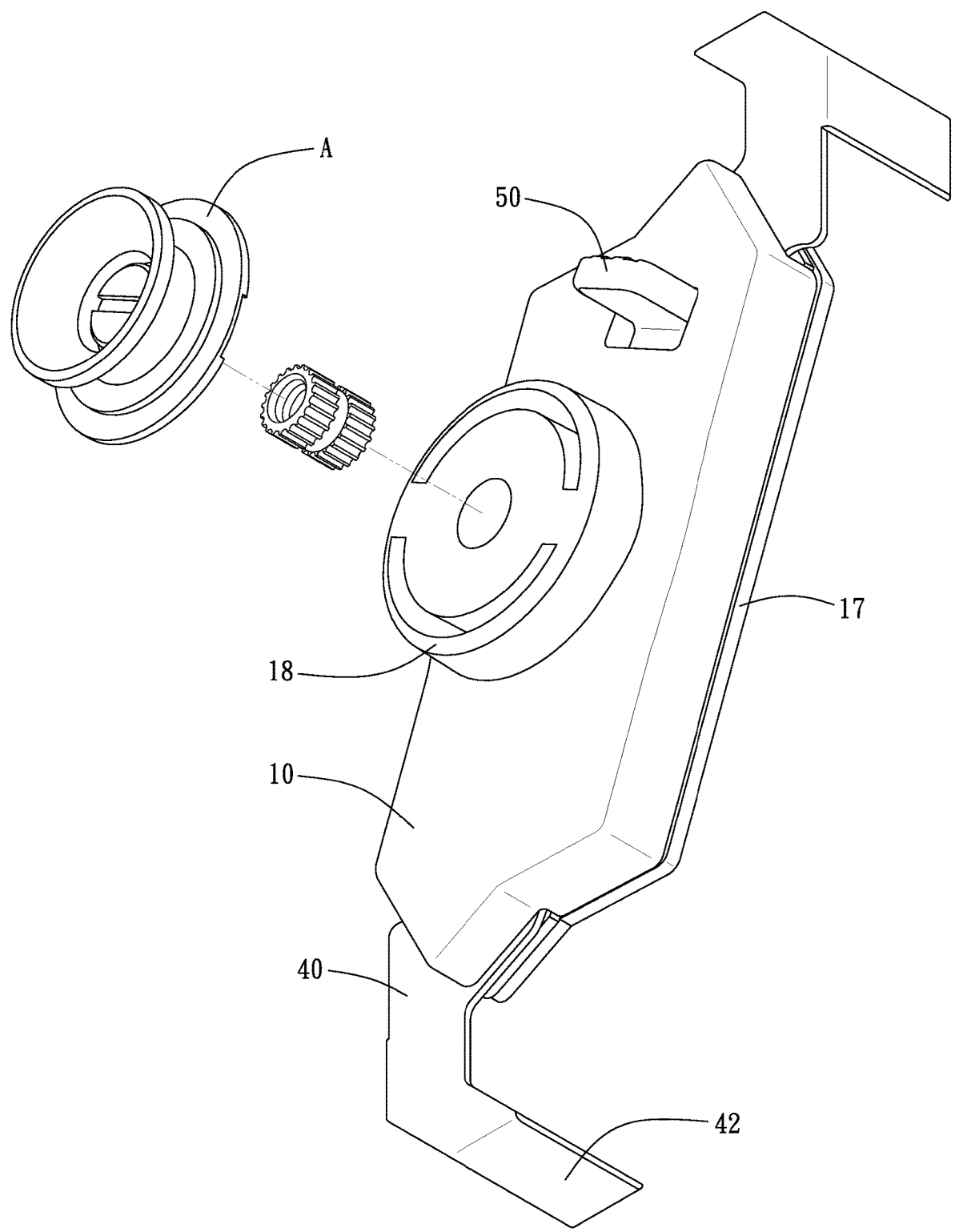
FIG. 7 is a schematic view illustrating a combination status of the telescopic bracket, wherein the bracket is attached to a fixation pedestal through a mounting portion of the bracket.
Figure 8:
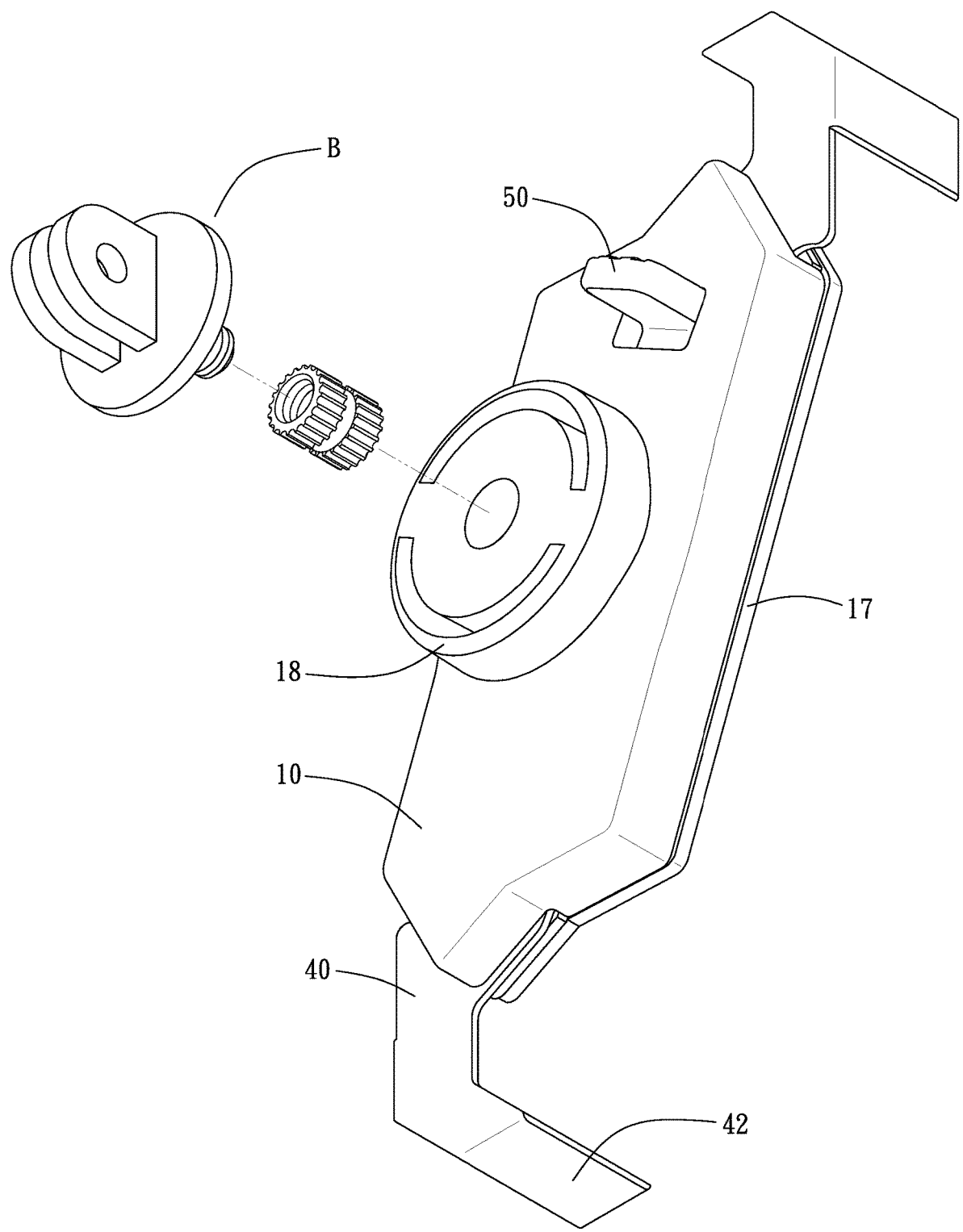
FIG. 8 is a schematic view illustrating a combination status of the telescopic bracket, wherein the bracket is attached to an adapter through a mounting portion of the bracket.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 9, an adjustable telescopic bracket 100 is provided for clamping an object. The object is allowed to be a mobile communication device, such as but not limited to, a smart phone, a tablet computer, and a personal digital assistant. The adjustable telescopic bracket 100 includes a main body 10, a driving assembly 20, an elastic assembly 30, and two telescopic members 40.

The main body 10 has an operating space 11 and a sliding groove 12 which horizontally penetrates the operating space 11. The driving assembly 20 is rotatably disposed in the operating space 11 and has a gearing portion 21 coaxially disposed with the driving assembly 20. In one embodiment of the present invention, the gearing portion 21 is arranged at an identical horizontal height with the sliding groove 12. In other words, the gearing portion 21 is arranged on a route along which the sliding groove 12 horizontally penetrates the operating space 11. A height of the gearing portion 21 is allowed to be equal to or slightly higher or lower than a depth of the sliding groove 12.

In the embodiment of the present invention, the operating space 11 is a circularly-shaped recess. The driving assembly 20 is a circular structure and has a rotary disk 22. The gearing portion 21 is arranged at a lateral surface 221 of the rotary disk 22 and coaxially disposed with the rotary disk 22. The rotary disk 22 has a peripheral wall portion 23 on another lateral surface 222 thereof in opposite to the gearing portion 21, wherein the peripheral wall portion 23 forms a hollow structure therein, with a bottom of the peripheral wall portion 23 hollowed. The peripheral wall portion 23 is discontinued at one side thereof, wherein a retaining end 231 is disposed at the end. The peripheral wall portion 23 is directly disposed in the operating space 11, without any backboard needed for covering the space surrounding by the peripheral wall portion 23 in the operating space 11, thus achieving a structurally simplified assembly.

The elastic assembly 30 is disposed in the operating space 11 and has two ends connected with the main body 10 and the driving assembly 20, respectively. In the embodiment of the present invention, the elastic assembly 30 is a flat volute spring and disposed in the peripheral wall portion 23. The main body 10 has an axial portion 13 in the operating space 11, wherein the rotary disk 22 is axially connected to the axial portion 13. The main body 10 has a retaining pillar disposed in adjacent to the axial portion 13 in the operating space 11. The elastic assembly 30 has a first fixing end 31 and a second fixing end 32. The first fixing end 31 is at an inner side of the elastic assembly 30 and fixed to the retaining pillar 14. The second fixing end 32 is at an outer side of the elastic assembly 30, and fixed to the retaining end 231. Thus, when the driving assembly 20 rotates in a forward direction or a reverse direction, the elastic assembly 30 is accordingly extended or retracted. The elastic assembly 30 is able to generate a pre-force for being recovered to an initial status thereof. In the embodiment, the pre-force for operation is generated when the elastic assembly 30 is about to retract for being recovered to the initial status thereof.

In the embodiment, the number of the telescopic members 40 is for example but not limited to two. The number of the telescopic members 40 is also allowed to be one (for example, one of the two telescopic members 40 in the embodiment is fixed on the main body 10). The telescopic member 40 has a sliding portion 41 and a resisting portion 42. The sliding portion 41 is disposed in the sliding groove 12 and is able to slide along a single rectilinear direction. The resisting portion 42 is disposed at an end of the sliding portion 41, and is able to resist against the object. The sliding portions 41 of the two telescopic members 40 are stacked and disposed in the sliding groove 12. The sliding portion 41 has a driving section 43, which is connected with the gearing portion 21 and capable of transmitting a driving force. When the sliding portions 41 are extended, the driving section 43 drives the gearing portion 21, forcing the driving assembly 20 to rotate, whereby the elastic assembly 30 generates the pre-force. When the elastic assembly 30 is released (when the telescopic member 40 are stopped being extended), the pre-force drives the driving assembly 20 to rotate reversely. As a result, the resisting portion 42 is simultaneously retracted to the main body 10 with the sliding portion 41 at which the resisting portion 42 is disposed, so as to temporarily clamp the object through the resisting portion 42.

In a preferred embodiment, the gearing portion 21 is a gear, wherein the driving section 43 is a gear rack, so as to be transmittably meshed with the gearing portion 21. The sliding portion 41 has a stretched hole 411. The stretched hole 411 is a sealed hole with the driving section 43 arranged at a lateral side thereof. The stretched hole 411 has a same longitudinal direction with the sliding portion 41 at which the stretched hole 411 is arranged. The gearing portion 21 is disposed in the stretched hole 411 and meshed with the driving section 43. The sliding portion 41 has a guide groove 412 disposed between the resisting portion 42 and the driving section 43. The main body 10 has a guide block 121 disposed on two ends of the sliding groove 12, respectively, corresponding to the guide groove 412, such that the guide block 121 is disposed in the corresponding guide groove 412, thereby forcing the sliding portion 41 to straightly slide along in the sliding groove 12 in which the sliding portion 41 is disposed.

In a preferred embodiment, the main body 10 has a host groove 15 in adjacent to the operating space 11. The host groove 15 is allowed to house a toggle block 50. The toggle block 50 is able to be switched to reciprocate between a clamping position P1 and a releasing position P2. When the toggle block 50 is at the clamping position P1, the driving assembly 20 is blocked by the toggle block 50 and incapable of rotating. When the toggle block 50 is at the releasing position P2, the driving assembly 20 is away from the toggle block 50 and capable of rotating. In more detail, the rotary disk 22 of the driving assembly 20 has a peripheral tooth 223 mounted around a circumference of the rotary disk 22. The toggle block 50 has a retaining tooth 51 at an end thereof for corresponding to the peripheral tooth 223. When the toggle block 50 is at the clamping position P1, the retaining tooth 51 resists against the peripheral tooth 223, thereby blocking a rotation of the rotary disk 22. Thus, the rotary disk 22 is incapable of rotating, and the sliding portion 41 is also incapable of being extended and retracted in the sliding groove 12.

The toggle block 50 has an elastic end 52 at two ends thereof, respectively. The elastic end 52 has an engaging block 521 at an external side of an end thereof. The elastic end 52 is allowed to be elastically bent by a force imposed thereon, so as to cause the engaging block 521 to laterally move. The main body 10 has a plurality of engaging grooves 16 corresponding to the elastic ends 52. In the embodiment, the number of the engaging grooves 16 is two, wherein the two engaging grooves 16 are arranged in a front-rear direction. When the toggle block 50 is at the clamping position P1 or the releasing position P2, the engaging block 521 of each elastic end 52 is engaged with the engaging groove 16 and temporarily positioned. In other words, when the toggle block 50 is switched to the clamping position P1, the engaging block 521 of the elastic end 52 is engaged with the relatively anterior engaging groove 16 which is relatively in adjacent to the operating space 11. When the toggle block 50 is switched to the releasing position P2, the engaging block 521 of each elastic end 52 is engaged with the relatively posterior engaging groove 16, which is relatively away from the operating space 11.

The main body 10 has a lid portion 17 and a mounting portion 18. The lid portion 17 is disposed on the main body 10 for covering the main body 10 and positioning the driving assembly 20, the elastic assembly 30, the telescopic member 40, and the toggle block 50 in the main body 10. The mounting portion 18 is disposed on the opposite side with respect to the lid portion 17 for attaching the main body 10 to an external assembly. The external assembly is allowed to be a fixation pedestal A (shown in FIG. 7), or an adapter B (shown in FIG. 8) for achieving a positioning function, wherein the adapter B in a preferred embodiment is an adapter for a, for example but not limited to, sport camera. However, the adapter B is also allowed to be an adapter for other purposes.

Figure 9:
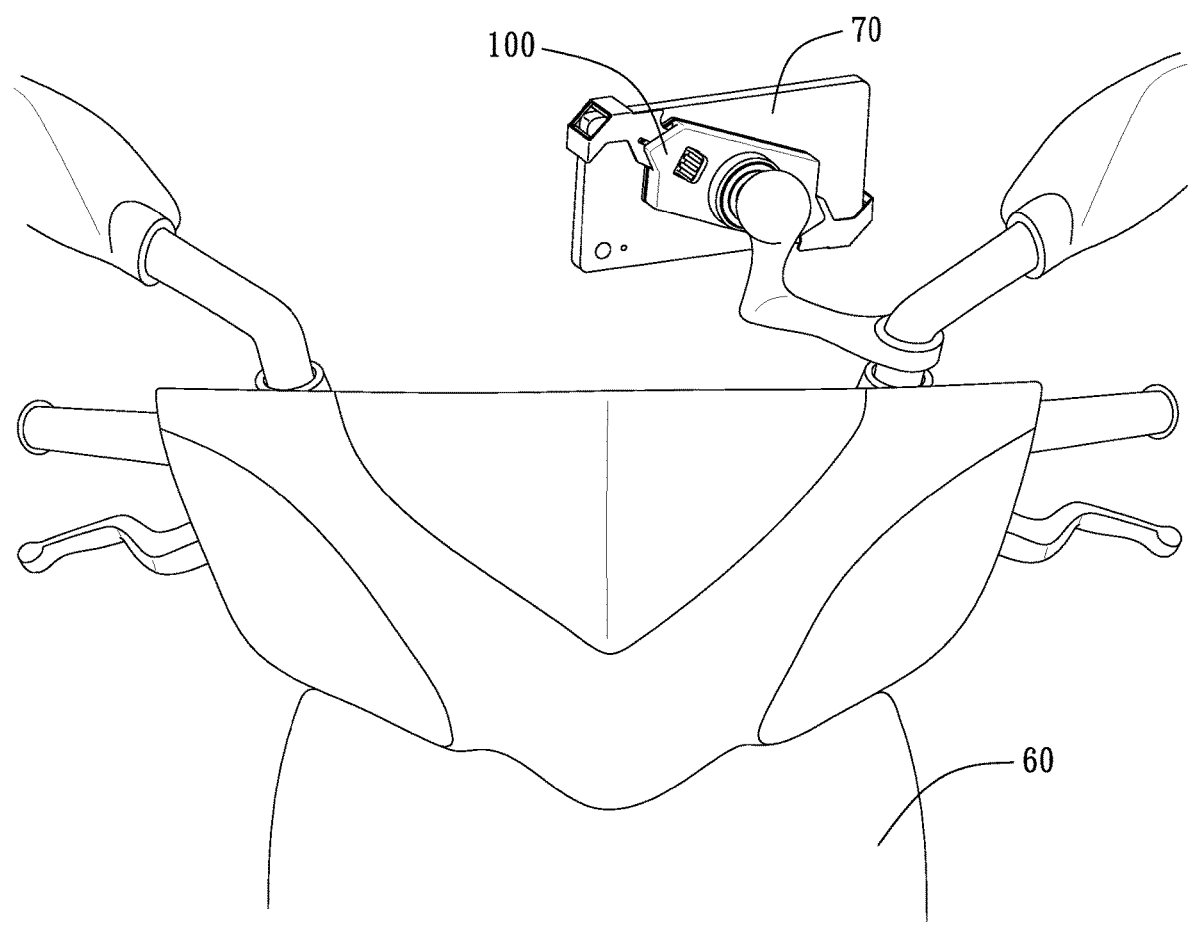
FIG. 9 is a schematic view illustrating a combination status of the telescopic bracket, wherein the bracket is disposed on a motorcycle for clamping a mobile communication device.

In operation, the main body 10 is able to be attached to a rearview mirror of a motorcycle 60 through the fixation pedestal A (shown in FIG. 9). When a user is attempting to place a mobile communication device 70 on the bracket 100, the user is able to use a single hand to extend one of the two telescopic members 40 on one side of the bracket 100 outward. When the telescopic member 40 is extended, the driving section 43 disposed on the sliding portion 41 drives the gearing portion 21, thereby forcing the driving assembly 20 to rotate. The sliding portion 41 of the other telescopic member 40 is also extended outward due to the fact that the driving section 43 of the other telescopic member 40 is driven by the rotation of the gearing portion 21. As a result, the two telescopic members 40 are simultaneously extended, causing the two resisting portions 42 to move away from each other (shown in FIG. 4), such that the user is able to easily place the mobile communication device 70 on the bracket 100 by one single hand. When the user releases the telescopic member 40, the pre-force generated by the elastic assembly 30 forces the driving assembly 20 to rotate reversely. The gearing portion 21 is also forced to rotate reversely, whereby the driving section 43 forces the two sliding portions 41 to be retracted to the main body 10. As a result, the two resisting portions 42 moves approaching to each other for temporarily positioning and clamping the mobile communication device 70 (shown in FIG. 5). Further, for preventing the mobile communication device 70 from falling due to the two resisting portions 42 expanding caused by accidentally pulled telescopic member 40, the toggle block 50 is allowed to be switched to the clamping position P1, so that the retaining tooth 51 resists against the peripheral tooth 223 (shown in FIG. 6), thereby blocking the rotation of the rotary disk 22. Only when the toggle block 50 is switched to the releasing position P2 and the retaining tooth 51 leaves the peripheral tooth 223 is the rotary disk 22 allowed to rotate.

As will be readily understood from the foregoing description, the present invention is characterized by that the adjustable telescopic bracket 100 is easily operated. When the adjustable telescopic bracket 100 is used to the clamp the object, the user is allowed to use a single hand to extend the telescopic members 40 simultaneously and to place the object on a predetermined position of the adjustable telescopic bracket 100. Afterward, when the user releases the telescopic member 40, the pre-force generated by the elastic assembly 30 forces the driving assembly 20 to rotate reversely, whereby the sliding portions 41 are simultaneously retracted to the main body 10. As a result, the two resisting portions 42 relatively move approaching to each other for temporarily positioning and clamping the object. The adjustable telescopic bracket 100 provides a more convenient and easily operated bracket for clamping the object than a bracket of a prior art which the user has to individually extend two telescoping clamp members thereof. Thus, the adjustable telescopic bracket 100 achieves a convenience for clamping the object and a relative safety for a lesser possibility of the object accidentally falling from the adjustable telescopic bracket 100.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An adjustable telescopic bracket for clamping and positioning an object, comprising:
   a main body having an operating space, with a sliding groove which horizontally penetrates the operating space;
   a driving assembly rotatably disposed in the operating space and having a gearing portion disposed coaxially with the driving assembly;
   an elastic assembly disposed in the operating space, with two ends of the elastic assembly connected with the main body and the driving assembly, respectively; and
   a telescopic member having a sliding portion disposed in the sliding groove, sliding along a rectilinear direction identical to a direction of the sliding groove, a resisting portion disposed on an end of the sliding portion to resist against the object, the sliding portion having a driving section which is transmittably connected with the gearing portion, the sliding portion extending to force the driving assembly to rotate, whereby the elastic assembly generates a pre-force; such that when the elastic assembly is released, the pre-force drives the driving assembly to rotate reversely, so that the resisting portion is simultaneously retracted to the main body with the sliding portion at which the resisting portion is disposed for clamping the object.

2. The adjustable telescopic bracket of claim 1, wherein the operating space is a circularly-shaped recess; the driving assembly is a circular structure and has a rotary disk; the gearing portion is arranged at a lateral surface of the rotary disk and disposed coaxially with the rotary disk.

3. The adjustable telescopic bracket of claim 2, wherein the rotary disk has a peripheral wall portion at another lateral surface of the gearing portion; the peripheral wall portion is directly disposed in the operating space, forming a hollow structure therein, wherein a bottom of the peripheral wall portion is hollowed.

4. The adjustable telescopic bracket of claim 3, wherein the elastic assembly is a flat volute spring disposed in the peripheral wall portion; the main body has an axial portion in the operating space, wherein the rotary disk is axially connected to the axial portion; the main body has a retaining pillar disposed in adjacent to the axial portion in the operating space; a first fixing end of the elastic assembly is disposed at an inner side of the elastic assembly and fixed with the retaining pillar; the peripheral wall portion is discontinued at one side thereof, wherein a retaining end is disposed on an discontinued end of the peripheral wall portion; a second fixing end of the elastic assembly is disposed at an outer side of the elastic assembly and fixed with the retaining end.

5. The adjustable telescopic bracket of claim 2, wherein the main body has a host groove in adjacent to the operating space for housing a toggle block; the toggle block is switched to reciprocate between a clamping position and a releasing position; when the toggle block is at the clamping position, the driving assembly is blocked by the toggle block and prevented from rotating; when the toggle block is at the releasing position, the driving assembly is away from the toggle block and rotatable.

6. The adjustable telescopic bracket of claim 5, wherein the rotary disk has a peripheral tooth mounted around a circumference of the rotary disk; the toggle block has a retaining tooth at an end of the toggle block; the retaining tooth is disposed corresponding to the peripheral tooth; when the toggle block is at the clamping position, the retaining tooth resists against the peripheral tooth, thereby blocking a rotation of the rotary disk.

7. The adjustable telescopic bracket of claim 6, wherein the toggle block has an elastic end on two ends of the toggle block, respectively, with an engaging block disposed on an external side of each elastic end, respectively; the main body has a plurality of engaging grooves corresponding to the elastic ends, wherein the engaging grooves are arranged in a front-rear direction; when the toggle block is at the clamping position and the releasing position, the engaging block of the elastic end being engaged with the corresponding engaging grooves and temporarily positioned.

8. The adjustable telescopic bracket of claim 1, wherein the gearing portion is a gear and the driving section is a gear rack transmittably meshed with the gearing portion; the sliding portion has a stretched hole which is a sealed hole, with the driving section arranged at a lateral side of the stretched hole; the stretched hole has a same longitudinal direction with the sliding portion at which the stretched hole is disposed; the gearing portion is disposed in the stretched hole, so as to be transmittably meshed with the driving section.

9. The adjustable telescopic bracket of claim 8, wherein the sliding portion of the telescopic member has a guide groove disposed between the resisting portion and the driving section; the main body has a guide block disposed in the sliding groove and arranged corresponding to the guide groove; the guide block in the guide groove forces the sliding portion to linearly slide along on the sliding groove in which the sliding portion is disposed.

10. The adjustable telescopic bracket of claim 1, wherein the main body has a lid portion and a mounting portion; the lid portion is disposed on a side of the main body; the mounting portion is disposed on a side of the main body in opposite to the lid portion for attaching the main body to an external assembly.

* * * * *